Figure 1:
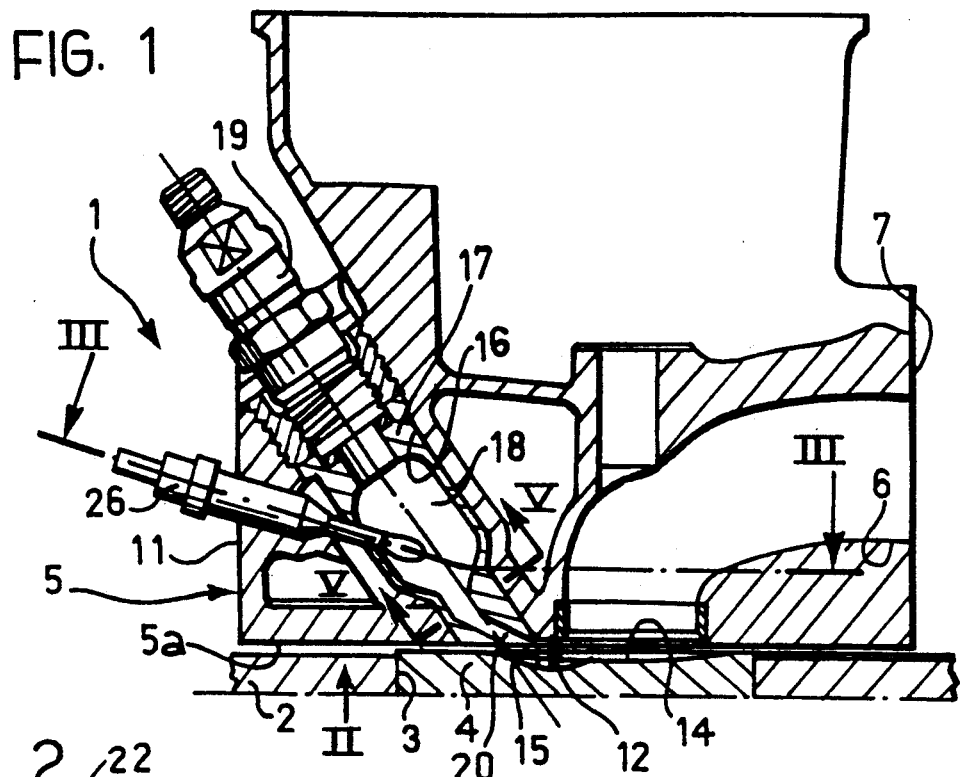

United States Patent [19]

Maiorana

[11] Patent Number: 5,033,430

[45] Date of Patent: Jul. 23, 1991

[54] DIESEL ENGINE WITH INDIRECT INJECTION

[75] Inventor: Giovanni Maiorana, Biella, Italy

[73] Assignee: Fiat Auto Spa, Torino, Italy

[21] Appl. No.: 580,725

[22] Filed: Sep. 11, 1990

[30] Foreign Application Priority Data

Sep. 11, 1989 [IT] Italy .................. 67754 A/89

[51] Int. Cl.⁵ ........................................... F02M 19/00
[52] U.S. Cl. .................................................. 123/275
[58] Field of Search ............... 123/275, 283, 284, 286, 123/262

[56] References Cited

U.S. PATENT DOCUMENTS

| | | | |
|---|---|---|---|
| 4,006,720 | 2/1977 | Sato et al. | 123/275 |
| 4,046,111 | 9/1977 | Nagano | 123/275 |
| 4,180,021 | 12/1979 | Yanagibara | 123/275 |
| 4,444,166 | 4/1984 | Kovacs et al. | 123/275 |
| 4,483,290 | 11/1984 | Nass | 123/284 |
| 4,641,617 | 2/1987 | Aoyama et al. | 123/275 |
| 4,765,293 | 8/1988 | Gonzalez | 123/275 |

Primary Examiner—Raymond A. Nelli
Attorney, Agent, or Firm—Sughrue, Mion, Zinn, Macpeak & Seas

[57] ABSTRACT

In a diesel engine with indirect injection, the precombustion chamber (18) and respective outflow duct (20) associated with each cylinder have a plane of symmetry which is tangential to the axis of the cylinder. In a preferred embodiment, the cylinder has an exhaust valve (13) whose axis (23) is near the plane of symmetry (21) of the precombustion chamber (18), and two inlet valves (8a, 9a) whose axes (24, 25) are arranged in a plane substantially parallel, or at any rate not greatly inclined, to the plane of symmetry (21) of the precombustion chamber (18).

4 Claims, 1 Drawing Sheet

DIESEL ENGINE WITH INDIRECT INJECTION

The present invention relates to diesel engines with indirect injection, of the type including:
 a cylinder block including at least one cylinder,
 a cylinder head mounted on the cylinder block,
 a main combustion chamber associated cylinder and formed at least partly in the surface of the head which faces the cylinder,
 a precombustion chamber formed in the head in correspondence with each cylinder and having a respective injector device had a respective preheating plug, and also including an outflow duct which puts the precombustion chamber into communication with the main combustion chamber, and
 at least one inlet duct and at least one exhaust duct which are provided with respective inlet and exhaust valves and which are formed in the head in correspondence with each cylinder and open in the surface of the head which faces the cylinder.

The object of the present invention is to provide an engine of the type specified above, which enables very efficient combustion to be obtained and at the same time is compact and of a simple and reliable construction.

In order to achieve this object, the subject of the invention is an engine of the type indicated at the beginning of the present description, characterised in that the precombustion chamber and its outflow duct have a plane of symmetry which is tangential to the axis of the respective cylinder.

The aforesaid characteristic distinguishes the engine according to the invention from conventional engines in which the plane of symmetry of the precombustion chamber contains the axis of the cylinder and usually also coincides with the plane of symmetry of the main combustion chamber.

The application of the invention is particularly (but not exclusively) advantageous when two or more inlet valves are associated with the cylinder. In this case, the surface of the head facing the cylinder has a recessed region of circular or multilobed outline into which the inlet and exhaust ducts open. The purpose of this recessed region is to prevent the valves from projecting below the lower surface of the head once they have been installed therein, so that the head with the valves installed can be transported on conveyor devices with rollers or belts or on pallets for handling in any way during the assembly of the head, which may be automated. The presence of the fairly extensive recessed region in the surface of the head which faces they cylinder means that, in order to rationalise the shape of the combustion chamber, a chamber portion of corresponding profile must be formed in the top of the piston. Consequently, the main combustion chamber generally assumes a wide, shallow and not very compact configuration.

The fact that, according to the invention, the plane of symmetry of the precombustion chamber and its inflow duct are tangential to the axis of the cylinder enables the best use to be made of the air in the main combustion chamber. In fact, since the gases emerging from the outflow duct are directed tangentially with respect to the axis of the cylinder, they can generate a vortex which optimises their mixing with the air in the main chamber by virtue of their angular momentum.

In the specific case of a cylinder with two inlet valves and one exhaust valve, according to the invention, the exhaust valve is arranged, with its axis near the plane of symmetry of the precombustion chamber and its outflow duct, whilst the axes of the two inlet valves are in a plane substantially parallel, and at any rate not greatly inclined, to the plane of symmetry of the precombustion chamber which is tangential to the axis of the cylinder.

The configuration described above, on the one hand, enables the precombustion chamber to be arranged in the most advantageous manner and, at the same time, provides an inlet duct of quite large dimensions.

Figure 2:
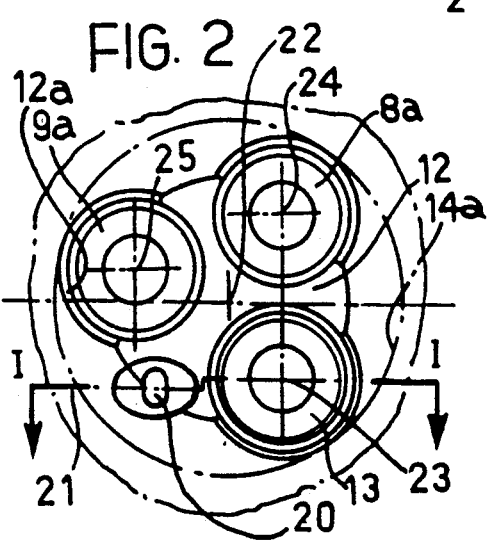
Figure 3:
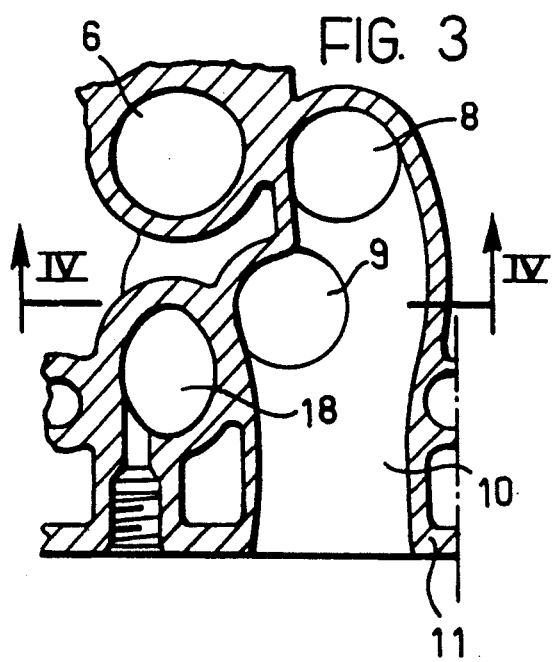
Figure 4:
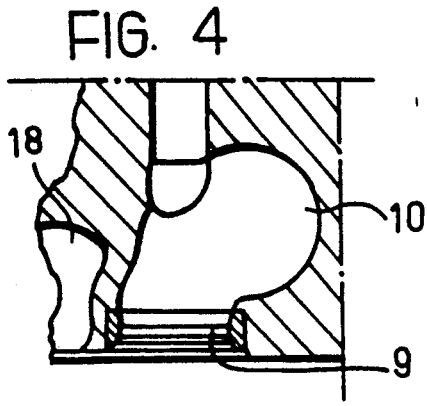
Figure 5:
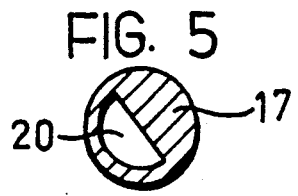

Further characteristics and advantages of the invention will become clear from the description which follows with reference to the appended drawings, provided purely by way of non-limiting example, in which:
 FIG. 1 is a sectional view of part of the engine taken on the line I—I of FIG. 2,
 FIG. 2 is a view on the arrow II of FIG. 1,
 FIG. 3 is a section taken on the line III—III of FIG. 1,
 FIG. 4 is a section taken on the line IV—IV of FIG. 3, and
 FIG. 5 is a section taken on the line V—V of FIG. 1.

With reference to the drawings, a diesel engine with indirect injection is generally indicated 1 and includes a cylinder block 2 in which a series of in-line cylinders 3 is formed. The sectional view of FIG. 1 is taken in a plane which is perpendicular to the plane containing the axes of the cylinders of the engine and contains the axis of one of the cylinders. A piston 4 is mounted slidably in the cylinder 3, but only its upper part is visible in the drawing.

A cylinder head 5 is fixed to the cylinder block 2 by bolts (not shown) and has a lower surface 5a which faces the cylinders 3. In correspondence with each cylinder, the head 5 has an exhaust duct 6 which extends from a side wall 7 of the head to the surface 5a facing the cylinder, and two inlet ducts 8, 9 which open in the surface 5a and constitute branches of a single duct 10 (FIG. 3) extending from an opposite side wall 11 of the head from the side wall 7. The surface 5a of the surface 5 has a recessed region 12 in correspondence with the ends of the exhaust duct 6 and the inlet ducts 8, 9 which open in the surface 5a. The recessed region 12 has a three-lobed outline, indicated 12a in FIG. 2. The caps of the exhaust valve 13 and the inlet valves 8a, 9a associated with the exhaust duct 6 and the inlet ducts 8, 9 are also visible in this drawing. The recessed region 12 means that, when the valves are installed, their caps do not stand proud of the surface 5a. This enables the head with the valves installed to be transported on various kinds of conveyor device (for example, with rollers or belts) during the assembly of the head. At the same time, the recessed region 12 defines a cavity which forms part of the main combustion chamber associated with the cylinder 3. The rest of the combustion chamber is constituted by a cavity 14 formed in the top of the piston 4 and having an outline 14a, shown by a broken line in FIG. 2. The cavity 14 includes a more recessed region 15 which constitutes an inlet channel for the gases emerging from the precombustion chamber, as will be described in detail below.

In correspondence with each cylinder, the head 5 has a passage 16 which extends from the side wall 11 to the lower wall 5a. The passage 16 acts as a seat for an insert 17 with an internal cavity 18 which constitutes the precombustion chamber. The upper part of the insert 17 acts as a seat for an injector device 19. In the embodiment illustrated, the combustion chamber has a cylindrical configuration with frustoconical upper and lower ends. The lower part of the cavity of the insert 17 also defines the gas outflow duct which puts the precombustion chamber 18 into communication with the main combustion chamber. The outflow duct (indicated 20) has a semicircular cross-section (FIG. 5) defined by a flat wall and a curved wall. In the portion of the duct 20 nearest the combustion chamber 18, the flat wall contains the axis of the cylindrical precombustion chamber 18. In the next portion, however, the flat wall is inclined to that axis so as to be at a smaller angle to the plane of the surface 5a of the head.

As is clear from the appended drawings, the precombustion chamber 18 and the adjoining outflow duct 20 have a plane of symmetry 21 which is tangential to the axis 22 of the cylinder (see FIG. 2 in particular).

This arrangement affords the advantages mentioned at the beginning of the present description. Moreover, the axis 23 (FIG. 2) of the exhaust valve is near the plane of symmetry 21 of the precombustion chamber 18 and of the outflow duct 20. The two inlet ducts, however, are arranged with their axes 24, 25 in a plane which is not greatly inclined (that is, inclined by less than 45°) to the plane 21. This arrangement differs markedly from the conventional solution used for a cylinder with one exhaust valve and two inlet valves. In the conventional solution, the exhaust valve is arranged with its axis in the diametral plane of the cylinder which coincides with the plane of symmetry of the combustion chambers, whilst the two inlet valves are arranged at the two sides of the precombustion chamber with their axes in a plane perpendicular to the plane of symmetry. However, this conventional arrangement penalises the inlet ducts which cannot be designed with very large dimensions.

The above-described arrangement adopted in the case of the present invention, however, allows the precombustion chamber to be arranged appropriately and, at the same time, the inlet duct to be of generous dimensions.

In FIG. 1, the preheating plug associated with the precombustion chamber 18 is schematically indicated 36.

I claim:

1. A diesel engine with indirect injection, comprising:

a cylinder block including at least one cylinder,
   a cylinder head mounted on the cylinder block,
   a main combustion chamber associated with each cylinder and formed at least partly in the surface of the head which faces the cylinder,
   a precombustion chamber formed in the cylinder head in correspondence with each cylinder and having a respective injector device and a respective preheating plug, and including an outflow duct which puts the precombustion chamber into communication with the main combustion chamber, and
   at least one inlet duct and at least one exhaust duct which are provided with respective inlet and exhaust valves and which are formed in the head in correspondence with each cylinder and open in the surface of the head which faces the cylinder,
   wherein the precombustion chamber and its outflow duct have a plane of symmetry which is tangential to the axis of the cylinder.

2. An engine according to claim 1, wherein the precombustion chamber has a cylindrical configuration with frusto-conical ends, the outflow duct having a semicircular cross-section defined by a flat wall and a curved wall, the flat wall containing the axis of the cylindrical precombustion chamber in the initial portion of the outflow duct nearest the precombustion chamber and the flat wall of the remaining portion of the outflow duct being inclined to the axis of the precombustion chamber.

3. An engine according to claim 1, wherein two inlet ducts and one exhaust duct are provided in correspondence with each cylinder, and wherein the axis of the exhaust valve is near the plane of symmetry of the precombustion chamber and the outflow duct, the axes of the two inlet valves being in a plane substantially parallel to the plane of symmetry.

4. An engine according to claim 3, wherein the two inlet ducts are branches of a single duct which extends from a side wall of the head, the side wall being the one in which is formed a passage constituting the seat from an insert with an internal cavity defining the precombustion chamber.

* * * * *